United States Patent

Best et al.

[11] Patent Number: 5,332,776
[45] Date of Patent: Jul. 26, 1994

[54] COATING COMPOSITIONS

[75] Inventors: Robert D. M. Best, Brussels, Belgium; Jean F. Brument, Rouen, France

[73] Assignee: Exxon Chemical Patents Inc., Linden, N.J.

[21] Appl. No.: 957,573

[22] Filed: Oct. 7, 1992

Related U.S. Application Data

[63] Continuation of Ser. No. 801,315, Dec. 2, 1991, abandoned, which is a continuation of Ser. No. 395,047, Aug. 17, 1989, abandoned.

[30] Foreign Application Priority Data

Aug. 18, 1988 [GB] United Kingdom ............ 88-19653.0

[51] Int. Cl.$^5$ ........................... C08K 3/26; C08K 3/30
[52] U.S. Cl. .................................. 524/419; 524/155; 524/157; 524/161; 524/166; 524/425; 428/470; 428/471
[58] Field of Search ............... 524/419, 155, 157, 161, 524/166, 425; 428/470, 471

[56] References Cited

U.S. PATENT DOCUMENTS

| | | | |
|---|---|---|---|
| 4,629,753 | 12/1986 | Quinn | 524/394 |
| 4,631,083 | 12/1986 | Christhilf et al. | 106/14.23 |
| 4,729,791 | 3/1988 | Laura et al. | 106/14.23 |
| 5,244,957 | 9/1993 | Best et al. | 524/418 |

Primary Examiner—Paul R. Michl
Assistant Examiner—John J. Guarriello
Attorney, Agent, or Firm—V. T. White

[57] ABSTRACT

A blend of from 10 to 90 parts by weight of a basic calcium sulphonate free of calcium carbonate in the calcite form and from 90 to 10 parts by weight of a terpolymer of 80 to 99 wt.% of an olefin containing from 2 to 4 carbon atoms, 1 to 30 wt.% of an unsaturated ester which is a vinyl ester of a carboxylic acid or an ester of acrylic or methacrylic acid and 1 to 20 wt.% of an unsaturated carboxylic acid is particularly useful for car undercoatings for corrosion and chip resistance which may be applied as high solids coatings.

16 Claims, No Drawings

COATING COMPOSITIONS

This is a continuation, of application Ser. No. 801,315, filed Dec. 2. 1991, now abandoned, which is a Rule 60 Continuation of U.S. Ser. No. 395,047, filed Nov. 17, 1989, now abandoned.

The present invention relates to new compositions and their use as coating materials particularly for the undercoating of automobiles to prevent chipping and corrosion.

Automobile undercoatings typically consist of several layers on the phosphorised metal. First the phosphorised metal is painted, it is subsequently coated with a layer of a polyvinyl chloride plastisol, generally applied as a dispersion, which is cured to provide a rendered chip resistant coating. Frequently the plastisol is filled with a substantial amount of filler typically calcium carbonate. Once the polyvinyl chloride layer is applied it may itself be coated with a layer of wax to inhibit decomposition of the polyvinyl chloride and consequential corrosion. There may also be incorporated an anticorrosion material which may be a thixotropic calcium sulphonate.

These coating systems are complex and furthermore there is a desire to replace the polyvinyl chloride to avoid toxicological problems in the disposal of vehicles by combustion. The need to fill the polyvinyl chloride to obtain the viscosity and abrasion resistant characteristics necessary for application and curing of the coating also requires that relatively thick and heavy layers be used, which is expensive and undesirable given the general desire to reduce the weight of vehicles.

The polyvinyl chloride layer furthermore provides very limited anticorrosion properties and its flexibility under changing temperature and stress conditions can be unsatisfactory.

Various alternate coating compositions have been tried but have not proved satisfactory since they do not satisfy one or more of the requirements, particularly the ability to be applied as a solution or dispersion which can be readily heat treated to give a coating with sufficient adhesion to metal which does not sag during heat treating and which has sufficient temperature and stress endurance. It is also desirable to have a coating that can be applied at a high solids level by the traditional spraying techniques at ambient temperature so reducing the amount of solvent used and facilitating its removal. Furthermore, it would be highly desirable to have a single treatment which provides both anticorrosion and chip resistance to the underside of the vehicle.

Numerous coating compositions have been proposed many of which have been used commercially, for the coating of ferrous and non-ferrous metals, which are susceptible to rust or corrosion, to prevent or to inhibit such rust or corrosion. As has long been known, rust or corrosion is caused by environmental conditions, such as contact of the metal surfaces by water; by air, particularly moist air; and by various chemicals or other materials which come into contact with the metal surfaces.

While, in most cases, ferrous metals such as iron and steels represent the areas where rust and corrosion problems are particularly encountered, various non-ferrous metals, for instance, aluminium, are also subject to corrosion.

The use of corrosion-inhibiting coating compositions, which contain thixotropic, or grease-like or gel-like thixotropic, alkaline earth metal organic sulfonates complexed with alkaline earth metal carbonates, with or without admixture with polymers, resins Or waxes, in a carrier or diluent of nonvolatile or volatile (or mixtures of nonvolatile and volatile) hydrocarbons and or other liquid solvents, is known and is disclosed in U.S. Pat. Nos. 3,453,124; 3,492,231; 3,565,672; 3,565,843; 3,661,622; 3,746,643; and 3,816,310; and United Kingdom Patent 1249144 and various patents referred to in the specifications of such patents. Various of such corrosion-inhibiting compositions are proposed for a variety of purposes, some including automobile and truck body undercoatings, and others for use in other environments. We have found however that these blends are unsatisfactory in that they have inadequate adhesion to metal.

In particular U.S. Pat. No. 3661622 described using a coating composition which is a solution of polymers of low crystallinity and a thixotropic calcium sulphonate. It is notable that these compositions have relatively low solids contents.

We have now developed a novel composition which enables high solids content (greater than 60 wt%) solutions to be prepared and applied as car under coatings.

The present invention therefore provides a blend of from 10 to 90 parts by weight of a non-thixotropic calcium sulphonate having substantially no absorption in the Infra Red Spectrum at 884 cm$^{-1}$ and from 90 to 10 parts by weight of a polymer, which, preferably, has the following properties:

i a low degree of crystallinity
ii a molecular weight in the range of from about 3,000 to about 1 million, and
iii a high solubility in predominantly aliphatic hydrocarbon solvents.

The term basic calcium sulfonate is descriptive of dispersions containing an excess of metal over the stoichiometric required to neutralise the dispersing agent, in this case, sulphonic acid. The basic calcium sulphonate used in the blend of the present invention is preferably a viscous composition dispersed in mineral spirit.

|  | Suitable | Preferred |
|---|---|---|
| Diluent* | 2–80 | 20–70 |
| Oil-soluble dispersing agent* | 5–55 | 6–35 |
| Calcium carbonate* | 1–45 | 5–30 |

*The specific nature of these materials will be described hereinafter in connection with the preparation of this composition.

While we have used the term calcium carbonate it may be well to mention that, although carbonate is the predominant anion, traces of other anions, e.g. hydroxide, oxide, and alkoxide, can be present. This is due to the fact that many processes for preparing dispersions of calcium carbonates involve carbonation of calcium hydroxide, oxide or alkoxide. Calcium Carbonate exists essentially in four forms, amorphous, arganite, vaterite and calcite, the presence of the various forms may be determined by infra red analysis the absorbance being Calcite 884 cm$^{-1}$, Vaterite 879 cm$^{-1}$, amorphous 860 cm$^{-1}$. We have found that in order to have the desired properties our coatings should contain calcium carbonate substantially free of absorbance at 884 cm$^{-1}$ unlike the commercial thixotropic calcium sulphonates traditionally used in metal protection coatings.

In addition to the nonvolatile diluent, oil-soluble dispersing agent, and basic calcium compound, the colloidal dispersions may contain minor amounts of the alcohol which is employed in manufacturing the colloidal dispersion, and of the metal-containing intermediate which may be employed in manufacturing the colloidal dispersion.

A wide variety of nonvolatile diluents are suitable in the colloidal dispersions used as the starting material. The principal requisite desired in the nonvolatile diluent is that it will act as a solvent for the dispersing agent which is used. Examples of nonvolatile diluents which can be used include mineral lubricating oils obtained by any of the conventional refining procedures; liquid synthetic lubricating oils, vegetable oils, such as corn oil, cotton seed oil, and caster oil; animal oils, such as lard oil and sperm oil; and waxes, such as the petroleum waxes. Of the waxes, the microcrystalline waxes are preferred. Of the oils in the preceding examples, the mineral lubricating oils are preferred.

It should be noted that when a wax is used as the nonvolatile diluent, the colloidal dispersion is a solid at room temperature.

A variety of oil-soluble dispersing agents are suitable in the colloidal dispersions which are used in preparing the product used in my invention. Generic examples of suitable dispersing agents include oil-soluble sulfonic acids, carboxylic acids, and the metal salts thereof. The preferred dispersing agents for preparing the grease-like product used in my invention are the oil-soluble sulfonic acids and metal sulfonates.

The term "oil-soluble sulfonates" as used herein, refers to those sulfonates wherein the hydrocarbon portion of the molecule has a molecular weight in the range of about 300 to about 1,200. Preferably, this molecular weight is in the range of about 900 to about 1,100. These oil-soluble sulfonates can be either synthetic sulfonates or the so-called mahogany or natural sulfonates. The term "mahogany sulfonates" is believed to be well understood, since it is amply described in the literature. The term "synthetic sulfonates" refers to those sulfonates which are derived from sulfonation feedstocks which are prepared synthetically. The synthetic sulfonates include alkyl sulfonates and alkaryl sulfonates. The alkaryl radical can be derived from benzene, toluene, ethyl benzene, xylene isomers, or naphthalene. Preferably, the alkyl groups are branched chain.

Mixtures of sulfonates derived from alkaryl hydrocarbons having straight-chain alkyl groups and alkaryl hydrocarbons having branched-chain alkyl groups, and wherein the amount of sulfonate derived from branched-chain alkaryl hydrocarbons is at least 40 per cent by weight, are particularly suitable. Preferably, the amount of sulfonate derived from branched chain alkaryls is at least 60 per cent by weight.

An example of still another oil-soluble synthetic alkaryl sulfonate, which is particularly useful for preparing colloidal dispersions, is the sulfonate derived from a sulfonation feedstock which is referred to as "NAB Bottoms". NAB Bottoms are predominantly di-n-alkaryl, wherein the alkyl groups contain from eight to 18 carbon atoms. They distinguish primarily from the preceding sulfonation feedstocks in that they are straight-chain and contain a large amount of di-substituted material.

Other sulfonates which can be used in the colloidal dispersion employed as a starting material include, for example, mono- and poly-wax substituted naphthalene sulfonates, dinonyl naphthalene sulfonates, napthalene disulfide sulfonates, dicetyl thianthrene sulfonates, dilauryl betanaphthol sulfonates, unsaturated paraffin wax sulfonates, hydroxy substituted paraffin wax sulfonates, cyclo-aliphatic sulfonates, such as lauryl-cyclohexyl sulfonates, mono- and poly-wax substituted cyclohexyl sulfonates, and the like.

We have found that in order to obtain a composition applicable at high solids the calcium carbonate in the basic calcium sulphonate should be of an amorphous type with low crystallinity. This morphology of the carbonate also contributes to the fluidity of the product at low temperature (i.e. below 40° C.), retention of adhesion to metal when incorporated into the terpolymer and enhances the ability to retain adhesion under stress at temperatures from $-40°$ C. to $120°$ C.

In our products the Calcium Sulphonate should have a low sedimentation value indicating little tendency for the particles to form associations which results in an increase of structure or rigid forces—an undesirable property for film forming substances requiring retained adhesion under stress at temperatures ranging from $-40°$ C. to $+12°$ C.

The preferred basic calcium sulfonate for use in the present invention is prepared by a process which results in a controlled crystalline growth where the three dimensional growth does not occur, but instead the crystallite formed is a flat, thin platelet.

The characteristics of the finished product are closely tied up to the manufacturing process conditions especially
- temperature and time of carbonation
- carbonation and point
- cooling profile after solvent removal In our preferred process Methanol is charged first; the calcium hydroxide is then added whilst stirring with the temperature between 15° and 27° C. (the dissolution of calcium hydroxide in methanol is slightly endothermic).

A solvent is then charged to the reactor and mixed with the calcium hydroxide/methanol suspension maintaing the temperature constant. Sulfonic acid is then slowly charged to the reactor and the reactor temperature must be adjusted in the range of 27 +2° C.

This product is then carbonated at 27±2° C. The reaction heat is 28.3 Kcal/mole of $CO_2$. The total quantity of carbon dioxide should be injected at a constant feed rate in a minimum of time (3-4 hours). Typically a carbonation time of 3.5 hours is optimum; 4 hours should be considered as a maximum.

Carbonation is continued until all the stoichiometric quantity of $CO_2$ has been absorbed; at that point, $CO_2$ is no longer absorbed and bubbles through the reaction mixture. $CO_2$ injection should be stopped at this breakpoint.

When the carbonation is completed, the reactor should be heated to reach 60° C. in about one hour. When the temperature reaches 60° C., it is then cooled down to room temperature. At that point the characteristics of the reaction mixture as as follows:

| | |
|---|---|
| density at 20° C. | 0.95 |
| viscosity | |
| at 22° C. (cst) | 90 |
| at 40° C. (cst) | 60 |
| flash point (°C.) | 10 |
| sediments (vol %) | 2.8 |

Solids are removed from the reaction mixture by centrifugation.

After centrifugation the reaction mixture is taken back to the reactor for solvents removal. The distillation profile is not very important for the product characteristics. Reactor is heated from 20° C. to 140° C. When the temperature is 125° C., a slight nitrogen purging may be applied (20 m³/m) in order to accelerate solvent removal.

The remaining solvent and water are stripped off by applying a reduced pressure (300 mm Hg, absolute) and a temperature of 140° C.

The product is stirred during the cooling operation and solvent added so as to obtain the desired TBN—(240 mg KOH/g). The product is scaled down to 0° C. The kinematic viscosity is then between 700 and 800 cst.

We have also found that this basic Calcium Sulphonate contributes to the adhesion of the coating composition to metal. Alternatively the basic sulphonate may be prepared by dispersing a non-crystalline or low crystalline calcium carbonate into the basic calcium sulphonate.

The term polymer as used herein includes certain copolymers which meet the specified requirements. Suitable polymers for use in our invention have the following properties:

a: low degree of crystallinity; i.e. less than 50 %, preferably less than 25 %, crystallinity,
b: a molecular weight in the range of from about 3,000 to about 1 million,
c: a high solubility in predominantly aliphatic hydrocarbon solvents, such as hexane, n-decane, Stoddard solvent, kerosene and petroleum lubrication oils.

Polymers meeting the above-listed description are often termed atactic or amorphous.

It is preferred that the copolymer have a Brookfield viscosity at 190° C of from 100 to 10000 mPas and a number average molecular weight of from 1000 to 10000. Our preferred copolymer has a Brookfield viscosity at 190° C of from 300 to 3000 mPas, a number average molecular weight of from 4000 to 8000, an unsaturated carboxylic acid content: 5 to 15 wt.% and an ester comonomer content of from 10 to 20 wt.%.

Examples of suitable types of polymers include low molecular weight or low density polyethylene, amorphous polypropylene, polyisobutylene, polyterpenes; copolymers of the foregoing with vinyl monomers, such as vinyl chloride, and vinyl esters, such as vinyl acetate; polyacrylic acids, and polymethacrylic acids. Particularly suitable polymers include polyterpenes, amorphous polypropylenes, polyolefins, ethylene-isobutyl acrylate copolymers and ethylene-vinyl acetate copolymers. Preferred polymers are the polyterpenes, amorphous polypropylenes, low molecular weight polyethylenes, and ethylene-vinyl acetate copolymers. Terpolymers such as terpolymers of ethylene/acrylic or methacrylic acid and vinyl acetate may also be used.

Relative amounts of polymer and non-thixotropic calcium sulphonate in our composition are

|  | Polymer | Parts by Weight Calcium Sulphonate |
| --- | --- | --- |
| Preferred | 0.1–25 | 75–99.9 |
| Most preferred | 0.2–10 | 90–99.8 |

No particular technique is required to prepare the blend of polymer and the calcium sulphonate. This is particularly true since usually the amount of polymer used is relatively small. After adding the required amount of polymer to the calcium sulphonate, preferably slowly in incremental amounts, the admixture is stirred sufficiently to provide a homogenous composition.

Application of the Composition to Metal Surfaces

The composition used in my invention can be applied "as is" to the metal surface, usually, by means of a brush. Preferably, the composition is diluted in a volatile solvent for application to the surface. The use of a volatile solvent provides a more uniform film on the metal surface and enables the use of a spray. The latter can reduce substantially the cost of applying the composition.

The nature of the volatile solvent used is not a salient feature of the invention, and it is believed those skilled in the art, without undue experimentation, can readily ascertain suitable solvents. Examples of suitable solvents include volatile hydrocarbon solvents, such as Stoddard solvent, kerosene, petroleum naphtha and the like. Also, certain nonflammable chlorohydrocarbons are suitable. For safety, it is preferably to use solvents having a flash point of at least 100° F. and even higher. The amount of solvent is dependent on the particular method of application. We have found that the use of the particular solvent claimed allows production of a high solids content solution of viscosity such that it may be readily applied to the metal.

We have found that the compositions of our invention can be dissolved in conventional solvents to provide solutions containing greater than 60 wt.% solids, typically 60 to 70 wt.% solids and these solutions may be applied by conventional techniques to provide effective anti-corrosion and chip protection for metals and such a use is part of the present invention as are metals coated with the composition. It is believed that the polymer provides high adhesion to the metal, high strength to the coating combined with flexibility and resistance to chipping. The calcium sulphonate, on the other hand, provides anticorrosive properties to the coating and is miscible with the terpolymer. A solution of the composition may be obtained at low solvent levels, less than 30% solvent, possibly less than 20% which does not alter significantly in viscosity after recovery from temperature cycling from −20° to +20° C.

The viscosity and flexibility of the compositions of the present invention, their adhesion to metal, their hardness and thus resistance to chipping may be controlled by the inclusion of other components in the composition such as petroleum and terpene resins, soaps which may or may not be oxidised salts of oxidised paraffinic oils, alkenyl succinic anhydrides and rosin esters. The properties of the composition may also be controlled by chemical means such as cross-linking with peroxides, amines or anhydrides.

To better understand the properties provided by some of the preferred additional components the basic properties of these components are summarised as follows Calcium Soaps of Oxidised Paraffinic Oils The air oxidation of paraffinic oils in the presence of a promoting catalyst is well known for example a base oil such as 150 Solvent Neutral (STANCO 150) may be oxidised at a temperature of approx 140° C. using an air flow of 950 S.C.F./min/tonne using a manganese salt in the presence of potassium hydroxide solution as an oxidation promoter.

Typically oxidation is terminated when the following properties have been obtained.

| Property | Test Method | Property |
|---|---|---|
| Acid No mgKOH/gm | D974 | 45–50 |
| Saponification No MgKOH/gm | D94 | 110–130 |
| Viscosity K.V. wt 98.9° C. | D12 | 17–22 |
| Pour Point °C. |  | −10 |

The oxidised Paraffinic Oil may then be converted to the calcium soap using Ca (OH)$_2$ in excess of the amount necessary to neutralise the carboxylic acids and the formed soap is solubilised as a 80% concentrate in white spirit and filtered through an 80 micron screen. Typical properties of the soap are

| Appearance | Dark Viscous |
|---|---|
| Melt Point (Dry Soap) | 160° C. |
| Calcium Content % mass | 2.4 |
| Flash Point C.O.C. °C. | 43 |

Typical Viscosity, Brookfield R.V.T. spindle No.4 Temp 40° C.

| RPM | 2.5 | 5.0 | 10.0 | 20 | 50 | 100 |
|---|---|---|---|---|---|---|
| Viscosity (Poise) | 100 | 100 | 100 | 98 | 95 | 90 |

These Calcium Soaps of oxidised oils polymerise under heat to form a lacquer type film. Having a hardness as measured by the pencil scale (Paint Industry) of H thus impart improved abrasion resistance to the coating.

Alkenyl Succinic Anhydride (ASA)

If ASA is used it preferably has the following formula

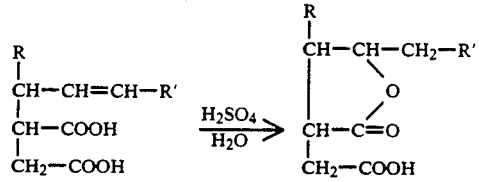

where m+n=12–17
and m may be zero

ASA is soluble in acetone, benzene, petrol and ether. ASA is not soluble in water and its function in the formulation is believed to depend on its capacity to react with the residual water present in the basic Calcium Sulphonate and Calcium Soap of the oxidised oil when present. This hydrolysis reaction forms the alkenylsuccinic acids as follows:

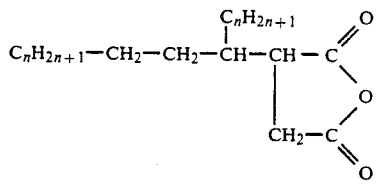

-continued $$R'-CH=CH-\underset{|}{CH}-\underset{|}{\overset{R}{CH}}-COOH$$
$$\phantom{R'-CH=CH-CH-}CH_2-COOH$$

Acid hydrolysis converts the alkenyl diacids to 5 and 6 membered ring lactone acids e.g.

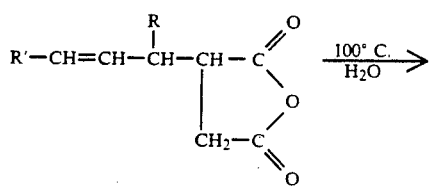

The presence of the A.S.A. contributes to accelerating the setting time of the composition and subsequent hardness and adhesion at temperatures above 140° C.

Dimerised Rosin Esters

Pentaerythritol Esters of Rosin are well known for their use as film formers in the adhesives industries.

They are characterised by their high softening point (120°–140° C.) and solubility in aliphatic solvents and capacity to reduce the viscosities of the terpolymers of ethylene, vinyl acetate and acrylic acid.

The inclusion of rosins ester in the compositions of the present invention promotes a mechanism for release of the solvent without forming discontinuities in the polar bonding of the film to the metal substrate.

The preferred compositions of the present invention therefore comprises 5 to 60% wt more preferably 20 to 60 wt% of the basic calcium sulphonate
20 to 75% more preferably 20 to 60 wt% of the polymer
1 to 40% wt of a calcium soap of an oxidised petrolatum
1 to 30% more preferably 1 to 5 wt% of a dimerised rosin ester
1 to 5% wt of an alkyl succinic anhydride
and a solution thereof containing from 60 to 70 wt.% solids.

The present invention is illustrated by the following Example in which the terpolymer was blended with a calcium sulphonate free of calcite of total base number 240 and the blend evaluated for its rheological and adhesive properties. The polymer used in the composition was:

| a random copolymer of ethylene, acrylic acid and vinyl acetate | |
|---|---|
| Brookfield viscosity at 190° C. | 2800 mPa.s |
| Acrylic acid | 16 wt. % |
| Vinyl acetate | 7 wt. % |
| Acid Number | 100 mgKOH/grm |

The compositions were prepared by the following steps
1. Into a glass vessel equipped with a paddle mixer and overhead condenser was charged 500 parts of basic calcium sulphonate having the following properties.

| Property | Test Method | Property |
|---|---|---|
| Calcium Sulfonate % mass | D3712 | 24.5 |
| Total Base No mgKOH/gm | D2896 | 265 |

-continued

| Property | Test Method | Property |
|---|---|---|
| H$_2$O Content | D95 | 0.2 |
| Mineral Oil % mass | D3712 | 3.3 |
| Mineral Spirit (W. Spirit) | | 50.0 |
| Sedimentation Vol. % | HMS 77.081 | 0.1 |
| K.V. 60° C. cSt | D445 | 2,000 |
| Brookfield Vis °C. CPS (No 4 spindle at 0.3 RPM) | | 10,000 |
| Density at 15° C. kg/m$_3$ | D1298 | 980 |

The temperature was increased to 60° C. with stirring.

2. To the Calcium Sulphonate was added 5 grams of the polymer. The temperature was increased to 1500° C. Solvent was returned to the charge to maintain equilibrium. A nitrogen purge was used to assist in the removal of the water of reaction.—mixing time 20 rains.

3. The temperature was reduced to 80° C. and the 690HP oxidate was added after preheating to 70° C.

4. The mixing temperature was increased to 120° C. and the water of reaction removed under nitrogen purge over 20 minutes at 120° C.

5. The mixing temperature was reduced to 80° C. and the 150-20-70 calcium soap was added and blended over a period of 15 mins. at 80° C.

The blend had the following properties

| | |
|---|---|
| Drop melting point after solvent evaporation | 130° C. |
| Total base no. of product including solvent mg/KOH/gm | 117 |

Brookfield viscosity including solvent at 25° C. Spindle No. 4

| R.P.M. | 5 | 10 | 20 | 50 | 100 |
|---|---|---|---|---|---|
| Viscosity | 128 | 96 | 68 | 48 | 36 |

The performance of the products as anticorrosion coatings was evaluated under the following tests

A. Sag Resistance

A 50 micron dry film coating was sprayed on to a "Q" test panel with 30% of the surface area taped with an adhesive mask and allowed to dry over 4 hours.

The masking tape was removed and the panel was placed in an oven and heated to 160° over 2 hours.

Result - No sagging of the applied film

B. Cold Blend Flexibility

The coated panel after removal from the oven at 160° C. was chilled to −25° C. then subjected to cold bending for 30 minutes over a ⅛ inch mandrel.

The applied film remained intact during and after this test.

C. ASTM B117 Salt Fog Resistance

A 50 micron dry film was applied to "Q" test panels and subjected to salt fog exposure according to the test ASTM B 117 and there was no corrosion after 600 hours.

We claim:

1. A blend, having a solids content of greater than 60 weight percent, and consisting essentially of from 10 to 90 parts by weight of basic, colloidal disperse, non-thixotropic calcium sulphonate composition comprising calcium carbonate having substantially no infra-red absorbance at 884 cm$^{-1}$ and from 90 to 10 parts by weight of a polymer, which has the following properties:
   i a low degree of crystallinity of less than 50%,
   ii a number average molecular weight in the range of from about 3,000 to about 1 million, and
   iii a high solubility in predominantly aliphatic hydrocarbon solvents.

2. A blend according to claim 1 also containing a soap of an oxidised paraffinic oil.

3. A blend according to claim 1 containing an alkenyl succinic anhydride.

4. A blend according to claim 1 containing:
   5 to 60 weight percent of the basic calcium sulphonate;
   20 to 75 weight percent of the polymer;
   1 to 40 weight percent of a calcium soap of oxidised petroleum;
   1 to 39 weight percent of a dimerized rosin ester; and
   1 to 5 weight percent of an alkyl succinic anhydride.

5. A solution of a blend according to claim 1.

6. A method of protecting metal comprising spraying thereon a solution according to claim 5.

7. Metal coated with a blend having a solids content greater than 60 weight percent and from 10 to 90 parts by weight of a basic, colloidal dispersed, non-thixotropic calcium sulphonate substantially free from infrared absorbance at 884 cm$^{-1}$ and from 90 to 10 parts by weight of a polymer, which has the following properties:
   i a low degree of crystallinity of less than 50%
   ii a molecular weight in the range of from about 3,000 to about 1 million, and
   iii a high solubility in predominantly aliphatic hydrocarbon solvents.

8. Metal according to claim 7 in which the blend also contains a soap of an oxidised paraffin.

9. Metal according to claim 7 or claim 8 in which the blend also contains an alkenyl succinic anhydride.

10. Metal according to claim 7 in which the blend contains:
    5 to 60 wt% of the basic calcium sulphonate;
    20 to 75 wt% of the polymer;
    1 to 40 wt% of a calcium soap of oxidised petrolatum;
    1 to 30 wt% of a dimerised resin ester;
    1 to 5 wt% of an alkyl succinic anhydride.

11. A composition comprising from 10 to 90 parts by weight of a polymer having:
    a degree of crystallinity of less than 50 percent, 3,000 to about 1 million, and
    a high solubility in predominantly hydrocarbon solvents; and
    from 10 to 90 parts by weight of colloidal disperse, non-thixotropic overbased calcium sulphonate containing more than 60 weight percent solids and comprising:
    calcium sulphonate, and
    an amount of calcium carbonate in excess of the amount required to neutralize the sulphonate anions present,
    with substantially all of the calcium carbonate in the composition being free of calcium carbonate having an infra red absorbance at 884cm$^{-1}$.

12. The composition as recited in claim 11 further comprising a solvent.

13. A method of protecting metal comprising the steps of:

forming a solution, having a solids content of greater than 60 weight percent, of a solvent and at least 60 weight percent of a composition comprising from 10 to 90 parts by weight of a polymer having a degree of crystallinity of less than 50 percent, a number average molecular weight of from about 3,000 to about 1 million, and a high solubility in predominantly hydrocarbon solvents; and from 10 to 90 parts by weight of a colloidal disperse, nonthixotropic overbased calcium sulphonate comprising calcium sulphonate, and an amount of calcium carbonate in excess of the amount required to neutralize the sulphonate anions present, with substantially all of the calcium carbonate in the composition being free of calcium carbonate having an infra red absorbance at 884 $cm^{-1}$; and spraying the solution on to a metal surface.

14. The method as recited in claim 13 further comprising the step of drying the coating.

15. The method as recited in claim 13 wherein there is from about 60 to about 70 weight percent of the composition in the solution.

16. A method of protecting metal consisting essentially of the steps of:

forming a solution, having a solids content of greater than 60 weight percent, of a solvent and at least 60 weight percent of a composition consisting essentially of:

from 10 to 90 parts by weight of a polymer having a degree of crystallinity of less than 50 percent, a number average molecular weight of from about 3,000 to about 1 million, and a high solubility in predominantly hydrocarbon solvents; and from 10 to 90 parts by weight of a colloidal disperse, non-thixotropic overbased calcium sulphonate comprising calcium sulphonate, and an amount of calcium carbonate in excess of the amount required to neutralize the sulphonate anions present, with substantially all of the calcium carbonate in the composition being free of calcium carbonate having an infra red absorbance at 884 $cm^{-1}$; and spraying the solution on to a metal surface.

* * * * *